M. P. JACKSON.
CURD-CUTTER AND AGITATOR.

No. 190,219.                          Patented May 1, 1877.

Witnesses;
George B Stone
W. P. Bell

Inventor;
Morgan P. Jackson,
per Lambert & Darlington
attys.

N. PETERS, PHOTO-LITHOGRAPHER, WASHINGTON, D. C.

UNITED STATES PATENT OFFICE.

MORGAN P. JACKSON, OF BOONVILLE, NEW YORK.

IMPROVEMENT IN CURD CUTTERS AND AGITATORS.

Specification forming part of Letters Patent No. 190,219, dated May 1, 1877; application filed February 10, 1877.

*To all whom it may concern:*

Be it known that I, MORGAN P. JACKSON, of Boonville, in the county of Oneida and State of New York, have invented certain new and useful Improvements in Curd Cutters and Agitators; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The invention herein claimed is a combined curd cutter and agitator, for use in the manufacture of cheese; and consists of a number of double-edged blades, made of tin or other suitable material, in the manner herein described, extending longitudinally at right angles to and through a number of cross or horizontal blades of similar material, double edged, perforated with slots through which the longitudinal or main blades pass, being thus firmly held and secured, as herein described, without the necessity of wooden or metallic plates or head pieces or other framework whatsoever; and also in the adjustment or adaptation to said blades of a handle, by means of a slot or slots, and plain and bladed braces, as herein described.

Figure 1:
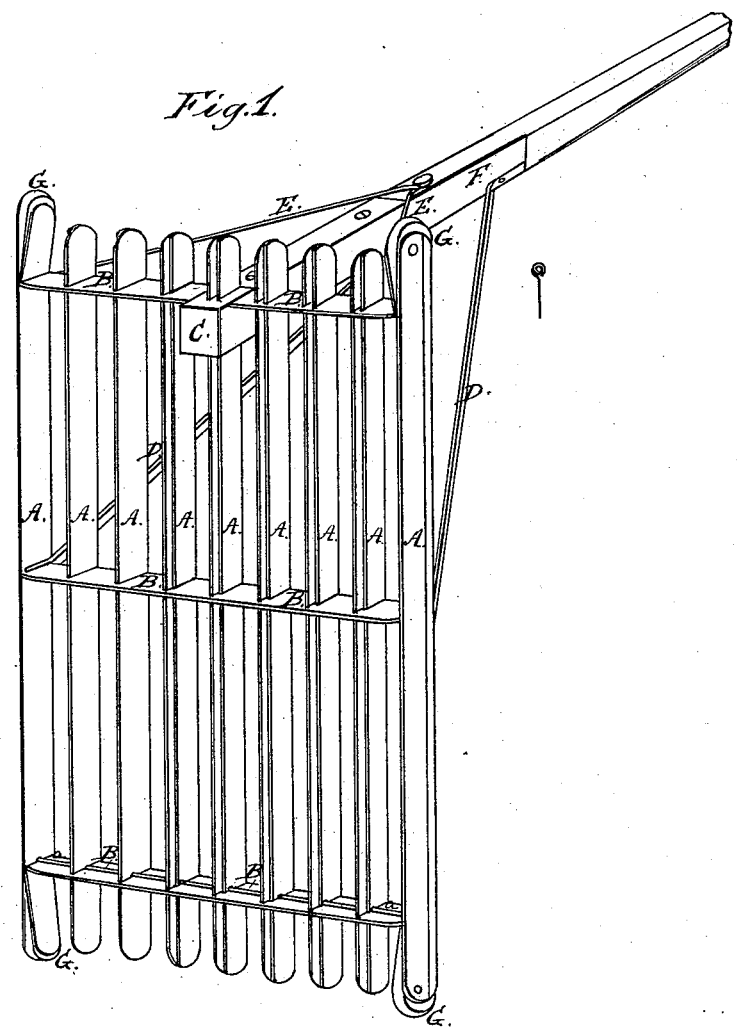
Figure 2:

In the accompanying sheet of drawings, Figure 1 is a perspective view of my curd cutter and agitator. Fig. 2 is a cross-section of the blades A A.

A A are the main or longitudinal blades, composed of two strips of tin or other suitable inexpensive material, joined or locked together in the center and rolled or hammered down solidly, and riveted, soldered, or otherwise fastened together, and secured so as to form one solid blade, with two cutting-edges, as shown in Fig. 2, each edge being of one thickness of the material used, two of the blades—the two outermost or exterior blades, as in Fig. 1, for example—being made to extend slightly beyond the others, and provided at their extremities with slots to receive the guards or cushions G G, made of leather, india-rubber, or other suitable material, to prevent the cutting, scraping, or otherwise injuring of the vat in working the cutter and agitator.

B B are the horizontal or cross blades, made of either single or double strips of tin or other material used, provided with slots in the center, through which the longitudinal blades pass, strengthened by a parallel cross-wire, *a a*, thus preventing the blades from turning, swagging, or twisting out of place.

C is the handle, applied under the head or uppermost horizontal or cross blade, provided with a slot or slots, through which one or more of the central longitudinal or main blades pass, firmly secured to said uppermost cross and central main blades by soldering or otherwise, thus dispensing with the necessity of wooden or metallic plates or head-pieces, and cased at its lower or head end with tin or other suitable material, and soldered, so as to render it secure and water-tight, and prevent absorption of moisture and swelling.

The bladed braces D D are composed of wire, with strips of tin or other suitable material locked around said wires, in such manner as to form blades, of either single or double edges, for cutting, stirring, and agitating the curds.

The plain braces E E are composed of twisted wire extending from a point in the handle C, at a suitable distance above its junction with the head blade of the cutter and agitator, to a point at or near the outward extremities of said head-blade, thus preventing the handle from springing or twisting out of place under strain or pressure, and adding firmness and rigidity to the cutter and agitator.

Having thus described my invention, what I claim as new, and desire to secure by Letters Patent, is—

1. The bladed braces D, interposed between the blades A and handle C, and constructed of wire, with a strip of metal locked around said wire, so as to present a projecting cutting-edge to the curd, substantially as set forth.

2. The blades A, provided with cushions G, projecting beyond the intermediate blades, to keep said blades from contact with the curd-vat, substantially as set forth.

3. The cutting-blades A A, each constructed of two strips or pieces of tin or other metal, lapped and joined or locked together in the center in such manner as to form one solid blade with two cutting-edges, each edge being of a single thickness of the material used, substantially as described.

4. The combination of longitudinal and horizontal blades, the ends of the longitudinal blades being extended beyond the horizontal blades, so as to form cutting-edges.

In testimony that I claim the foregoing as my own I hereto affix my signature in presence of two witnesses.

MORGAN P. JACKSON.

Witnesses:
GEO. WHEELOCK,
CALVIN V. GRAVES.